United States Patent
Herrmann et al.

(10) Patent No.: US 10,393,579 B2
(45) Date of Patent: Aug. 27, 2019

(54) MINIATURE SPECTROMETER AND A SPECTROSCOPIC METHOD

(71) Applicant: Robert Bosch GmbH, Stuttgart (DE)

(72) Inventors: Ingo Herrmann, Friolzheim (DE); Martin Husnik, Stuttgart (DE); Eugen Baumgart, Stuttgart (DE); Christian Huber, Ludwigsburg (DE); Benedikt Stein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/755,765

(22) PCT Filed: Aug. 15, 2016

(86) PCT No.: PCT/EP2016/069320
§ 371 (c)(1),
(2) Date: Feb. 27, 2018

(87) PCT Pub. No.: WO2017/041992
PCT Pub. Date: Mar. 16, 2017

(65) Prior Publication Data
US 2018/0321083 A1  Nov. 8, 2018

(30) Foreign Application Priority Data

Sep. 10, 2015 (DE) .................. 10 2015 217 343
Oct. 12, 2015 (DE) .................. 10 2015 219 672

(51) Int. Cl.
*G01J 3/02* (2006.01)
*G01J 3/28* (2006.01)
*G01J 3/447* (2006.01)
*G01J 3/45* (2006.01)
*G01J 3/453* (2006.01)

(52) U.S. Cl.
CPC .......... *G01J 3/0224* (2013.01); *G01J 3/0205* (2013.01); *G01J 3/0208* (2013.01); *G01J 3/0256* (2013.01); *G01J 3/2803* (2013.01); *G01J 3/2823* (2013.01); *G01J 3/447* (2013.01); *G01J 3/45* (2013.01); *G01J 3/4531* (2013.01)

(58) Field of Classification Search
CPC ...... G01J 3/0224; G01J 3/0208; G01J 3/0256; G01J 3/447; G01J 3/45; G01J 3/0205; G01J 3/2823; G01J 3/4531; G01J 3/2803
See application file for complete search history.

(56) References Cited

U.S. PATENT DOCUMENTS 9,046,422 B2 * 6/2015 Kudenov ................ G01J 3/447
9,074,993 B2 * 7/2015 Kudenov ............... G01N 21/21
(Continued)

OTHER PUBLICATIONS

Kudenov M. et al., Compact real-time birefringent imaging spectrometer, Optics Express, Jul. 30, 2012, vol. 20, No. 16, pp. 17973-17986.
(Continued)

*Primary Examiner* — Violeta A Prieto
(74) *Attorney, Agent, or Firm* — Maginot, Moore & Beck LLP

(57) ABSTRACT

A miniature spectrometer includes an optical system, a polarization interferometer with a polarizer and a Savart element and an analyzer, a detection unit with a detector, and a data unit. The optical system of the miniature spectrometer is configured as a diffuser.

9 Claims, 3 Drawing Sheets

(56) References Cited

U.S. PATENT DOCUMENTS

| | | | |
|---|---|---|---|
| 9,316,539 B1 | 4/2016 | Phua | |
| 9,316,540 B1 | 4/2016 | Phua | |
| 2012/0268745 A1 | 10/2012 | Kudenov | |
| 2013/0027713 A1* | 1/2013 | Kudenov | G01J 4/04 356/491 |
| 2014/0078298 A1* | 3/2014 | Kudenov | G01J 3/2803 348/135 |
| 2014/0163389 A1* | 6/2014 | Kudenov | A61B 5/0075 600/476 |

OTHER PUBLICATIONS

International Search Report corresponding to PCT Application No. PCT/EP2016/069320, dated Nov. 28, 2016 (German and English language document) (7 pages).

Zhang C. et al., A Static Polarization Imaging Spectrometer Based on a Savart Polariscope, Optics Communications, Mar. 1, 2002, vol. 203, No. 1-2, pp. 21-26.

Kudenov M. et al., Compact Snapshot Birefringent Imaging Fourier Transform Spectrometer, Optical Sensing II, Aug. 12, 2010, vol. 7812, pp. 1-12.

* cited by examiner

MINIATURE SPECTROMETER AND A SPECTROSCOPIC METHOD

This application is a 35 U.S.C. § 371 National Stage Application of PCT/EP2016/069320, filed on Aug. 15, 2016, which claims the benefit of priority to Serial No. DE 10 2015 217 343.7, filed on Sep. 10, 2015 in Germany and Serial No. DE 10 2015 219 672.0, filed on Oct. 12, 2015 in Germany, the disclosures of which are incorporated herein by reference in their entirety.

BACKGROUND

The disclosure relates to a miniature spectrometer and to a method for ascertaining a spectrum of the radiation that is reflected, transmitted or emitted by an object.

The disclosure proceeds from a miniature spectrometer and a method for ascertaining a spectrum of the radiation that is reflected or emitted by an object.

"A static polarization imaging spectrometer based on a Savart polariscope" (Zhang et al., Optics Communications 203 (2002), 21-26) describes a polarization imaging spectrometer (PIS) based on a simple Savart polariscope. It produces a two-dimensional intensity distribution that contains in one spatial direction the interferogram and in the direction that is orthogonal thereto the image information. Both components are present at the same time and must be separated from one another. This two-dimensional distribution is recorded using a two-dimensional CCD (charge-coupled device) detector. The PIS comprises an infinity optical system, a polarization interferometer comprising a polarizer, a Savart polariscope and an analyzer, an imaging lens and a system for recording and processing signals. The infinity optical system produces from the rays arriving at each object point beam bundles that are parallel in themselves at different angles. The resolution of the PIS can be set via the size of the CCD detector and the thickness of the birefringent layers that form the Savart polariscope. The resolution increases as the size of the CCD detector and the thickness of the birefringent layers increase. The spectral resolution is additionally dependent on the useful angular range, the refractive index contrast between the two polarization directions and the focal length of the lens between Savart polariscope and detector.

SUMMARY

The present disclosure specifies a miniature spectrometer and a method for ascertaining a spectrum of the radiation that is reflected, transmitted or emitted by an object using a miniature spectrometer according to the disclosure.

A miniature spectrometer is a spectrometer having dimensions in the centimeter range, although smaller dimensions below the centimeter range are also included. The disclosure has the advantage that the miniature spectrometer according to the disclosure has a compact, miniaturizable construction. In addition, cost-effective manufacturing of the miniature spectrometer according to the disclosure is possible. The miniature spectrometer according to the disclosure is furthermore characterized by a great user-friendliness and a reduction of measurement errors, because the measurement result in a large range is independent of the angle of incidence of the light and of the distance between miniature spectrometer and measurement object. A further advantage that arises from the homogenization of the spatial image information is that only the spectral information is present in the data and no complex background signal needs to be taken into consideration. This increases the accuracy and reproducibility of the miniature spectrometer according to the disclosure.

This is achieved by way of a miniature spectrometer comprising an optical system, a polarization interferometer comprising a polarizer, a Savart element and an analyzer, a detection unit comprising a detector and a data unit, wherein the optical system is in the form of a diffuser. The resolution of a miniature spectrometer according to the disclosure advantageously is not dependent on the nature of the object and the type of the light source, because in the miniature spectrometer according to the disclosure, the diffuser always ensures that the acceptance angle of the Savart element of the miniature spectrometer is fully utilized. Due to the diffuser, the acceptance angle of the light coming from the object to be investigated is completely illuminated.

In a development of the miniature spectrometer according to the disclosure, the detection unit comprises a focusing optical unit, wherein the focusing optical unit is arranged in the beam path between the polarization interferometer and the detector. As a result, beams having the same path difference are advantageously focused at a common point of the detector. It is possible in this way to produce a spatially resolved interferogram.

Additionally or alternatively, the miniature spectrometer according to the disclosure can comprise a light source. It is therefore possible to illuminate the object to be investigated with said light source, with the result that the intensity of the light coming from the object to be investigated can advantageously be increased and thus the measurement result can be improved, or a sufficiently detailed measurement ultimately becomes possible. Depending on the application, the necessary knowledge of the spectral properties of the light illuminating the object may also be ensured only in this way. In addition, the use of spectral intensities and wavelengths that are independent of the ambient light is made possible by the light source. For example, it is also possible to excite spectra in frequency ranges that are not covered or only inadequately covered by the ambient light, such as ultraviolet or infrared light. Furthermore, the radiation that is excited by this source, absorbed or transmitted can be selected by way of modulating the light source. The measured spectrum coming from the object is not falsified by spectral components of ambient radiation in this way and also permits measurements in non-darkened spaces. This is indispensable in particular for daily use outside a controlled laboratory environment and thus for use in goods of day-to-day use. Such a light source can also be used to selectively illuminate a specific region, which is advantageous in particular in extensive samples having an inhomogeneous nature.

In an advantageous embodiment, the diffuser is arranged on the polarizer of the polarization interferometer. This makes possible a compact construction and miniaturization of the miniature spectrometer according to the disclosure.

The data unit of the miniature spectrometer according to the disclosure in one advantageous configuration can comprise a reference database. Internal evaluation of the spectrum of the radiation that is reflected or emitted by an object is hereby possible. The miniature spectrometer according to the disclosure can be used independently of any access to the Internet or external reference databases.

Alternatively, the data unit of the miniature spectrometer according to the disclosure can be configured as a communication interface for data transmission between the miniature spectrometer and an external evaluation element comprising a reference database and a data processing unit. Since the evaluation can be performed externally, the miniature spectrometer according to the disclosure in this embodiment has fewer components than in the previous embodiment and can therefore be manufactured advantageously in a more cost-effective manner. Furthermore, the external evaluation element can be used by several users, and an improvement of the reference database can be effected by transmitting feedback concerning the quality of the evaluation. In addition, an update of the reference database can therefore be performed.

In a further embodiment of the miniature spectrometer according to the disclosure, the detector is configured as a one-dimensional sensor matrix. One advantage is that, consequently, a very compact construction and miniaturization of the miniature spectrometer according to the disclosure are made possible.

In an alternative design form, the detector is configured as a two-dimensional sensor matrix. One advantage of this embodiment is that the interferogram is represented in one dimension and is repeated several times in the direction of the second dimension, with the result that the interferogram can be averaged over said second dimension and thus the signal-to-noise ratio is improved with respect to the use of a one-dimensional sensor matrix.

In a further embodiment, the optical system is configured as a directional diffuser. Advantageously, it can be adapted to an opening angle of the Savart element.

BRIEF DESCRIPTION OF THE DRAWINGS

Exemplary embodiments of the disclosure are represented in the drawings and will be explained in more detail in the following description. Identical reference signs in the figures designate identical elements or elements having identical effects.

In the figures

DETAILED DESCRIPTION

Figure 1A:
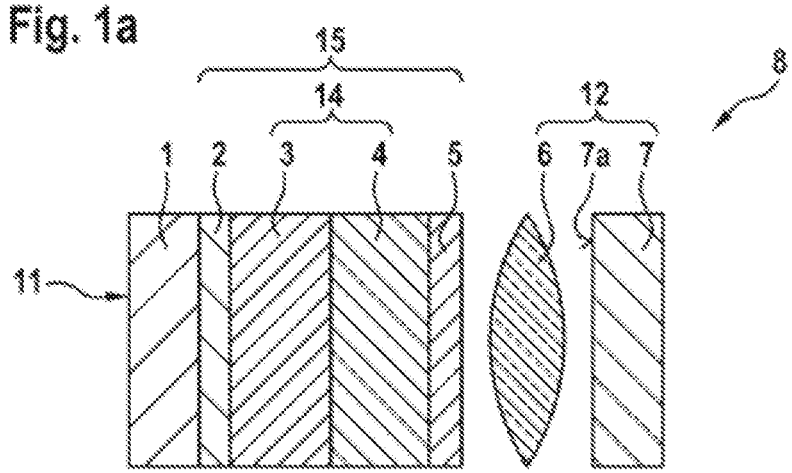
FIG. 1a shows the construction of the part according to the disclosure of a miniature spectrometer according to the disclosure.

FIG. 1a shows the construction of a miniature spectrometer 8 according to the disclosure. Figure 1a does not illustrate a data unit 13. An exemplary embodiment of a miniature spectrometer 8 according to the disclosure comprises an optical system, which is a diffuser 1, a polarizer 2, a first birefringent crystal 3, a second birefringent crystal 4, an analyzer 5, a lens 6 and a detector 7. The birefringent crystals 3, 4 together form a Savart element 14. The polarizer 2 and the analyzer 5 are arranged in the beam path on two mutually opposite sides of the Savart element. Together with the Savart element 14, they form a polarization interferometer 15. The diffuser 1 is arranged on a side of the polarizer 2 that is opposite the Savart element 14. In this exemplary embodiment, the diffuser 1 is applied directly to the polarization interferometer 15, which gives a highly compact arrangement. Arranged in the beam path on a side of the analyzer 5 that is opposite the Savart element 14 is a focusing optical unit 6. In this exemplary embodiment, the focusing optical unit is a lens 6. The lens 6 is configured as a converging lens, i.e. parallel beams that are incident on the lens 6 intersect in the focal plane of the lens 6. The detector 7 is arranged such that the radiation-sensitive surface 7a thereof is located in the focal plane of the lens 6. The radiation-sensitive surface 7a serves for detecting radiation. In this exemplary embodiment, the radiation-sensitive surface 7a is implemented by a two-dimensional arrangement of individual radiation sensors, what is known as a two-dimensional sensor matrix, in the focal plane of the lens 6. In an alternative exemplary embodiment, the radiation-sensitive surface 7a is implemented by way of a one-dimensional arrangement of radiation sensors, what is known as a one-dimensional sensor matrix, in the focal plane of the lens 6.

Alternatively, the focusing optical unit 6 can comprise at least one of the following elements: refractive element, diffractive element, holographic-optical element or reflective element.

Figure 1B:
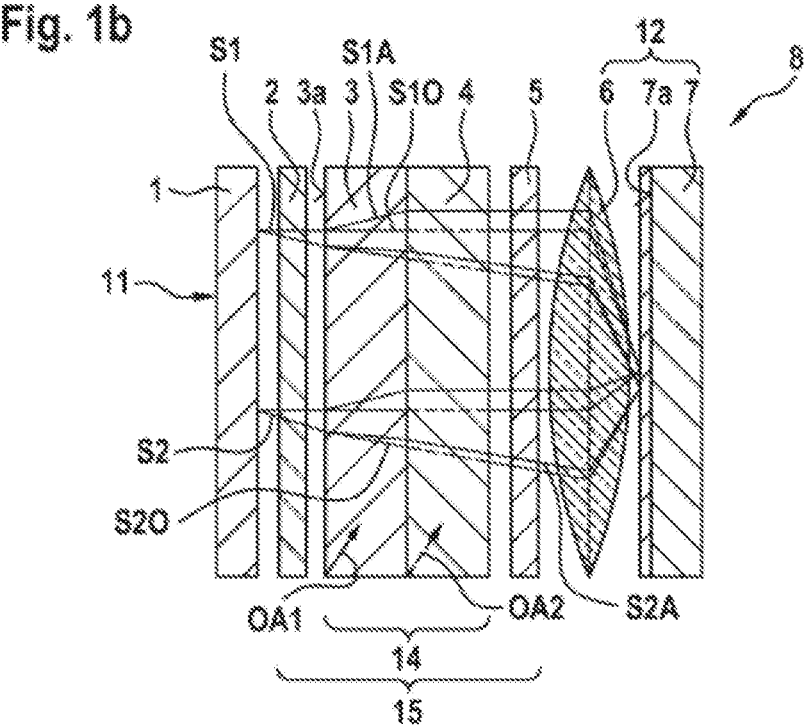
FIG. 1b shows a schematic illustration of the operating principle of a miniature spectrometer according to the disclosure, wherein the individual components are illustrated in a way in which they are separated from one another for better clarity.

FIG. 1b shows a schematic illustration of the beams as they travel through the various elements of the miniature spectrometer 8 according to the disclosure. The data unit 13 is not illustrated in FIG. 1b. For better clarity, the individual components of the miniature spectrometer 8 are illustrated as being arranged at a distance from one another. Solid lines lie in the drawing plane, dashed lines have a component going into the drawing plane. A beam travel is shown by way of example for two beams S1, S2, which are incident on the polarizer 2 at mutually different angles. In addition, the travel of said beams S1, S2 is shown proceeding from a further point on the diffuser 1. The diffuser 1 is an optical component. It has a large number of small scattering centers. Radiation that is incident on a first side 11 of the diffuser 1 is consequently deflected in different directions upon passage through the diffuser 1. The angular dependence of the intensity of the radiation exiting the diffuser has a defined form and is independent on the angular and intensity distribution of the radiation that is incident on the first side 11 of the diffuser 1. Therefore, the object to be investigated can be arranged with a large number of distances and angles with respect to the miniature spectrometer, without changing the measurement result of the miniature spectrometer. The radiation exiting the diffuser 1 is linearly polarized by the polarizer 2 that is arranged in the beam path. After passage through the polarizer 2, the linearly polarized radiation initially enters a first birefringent crystal 3 having a first optical axis OA1 and then passes through a second birefringent crystal 4 having a second optical axis OA2. A main section of the birefringent crystal 3, 4 is described by the plane that is perpendicular to the entry surface 3a and contains the optical axis OA1, OA2. In this exemplary embodiment, the angle between the first optical axis OA1 and the entry surface 3a is 45°. The main section of the second birefringent crystal 4 is rotated by 90° with respect to the main section of the first birefringent crystal 3. Birefringent materials have different refractive indices for different polarization of the incident radiation. In birefringence, the incident radiation is split into two components that are polarized in mutually perpendicular fashion. Firstly, into an ordinary beam, the electric field of which is perpendicular to the main section, and secondly, into an extraordinary beam, the electric field of which oscillates in the main section of the birefringent crystal 3, 4. The wavefronts of the ordinary and the extraordinary beam, which are referred to below as partial beams of the beam that is incident on the birefringent crystal, have different propagation velocities that are determined by the different refractive indices. As a result, the ordinary beam and the extraordinary beam have, after they pass through a birefringent crystal 3, 4, a phase difference that is dependent on the difference of the different refractive indices, the thickness of the birefringent crystals 3, 4 and the incidence angle. Said phase difference is proportional to a path difference of the partial beams. In this exemplary embodiment, the polarizer 2 is chosen such that the ordinary beam and the extraordinary beam in the Savart element 14 have the same intensity. The polarization direction is consequently selected such that it has an angle of 45° with respect to the main sections of the birefringent crystals 3, 4. The first beam Si is incident perpendicularly on the first birefringent crystal 3. It is split in the first birefringent crystal into an ordinary beam S1O and an extraordinary beam S1A. The ordinary beam S1O is refracted in accordance with Snell's law of refraction, and therefore it passes through the first birefringent crystal 3 without being deflected. A relative permittivity indicates the permeability of a material for electric fields. It is generally described by a tensor. As a result, the electric field is generally not parallel to the electric flux density. A propagation vector both in the material and outside the material is perpendicular to the electric flux density. The direction of the propagation vector is maintained also in the extraordinary beam S1A. However, the propagation direction of the extraordinary beam S1A is still determined by a Poynting vector that is perpendicular to the electric field. The angle between the propagation vector and the Poynting vector is equal to the angle between the electric field and the electric flux density. It is thus possible to determine the angle from the components of the electric field at which the extraordinary beam S1A passes through the first birefringent crystal 3. The main section of the second birefringent crystal 4 is perpendicular to the main section of the first birefringent crystal 3. The electric field of the extraordinary beam S1A thus oscillates perpendicularly to the main section of the second birefringent crystal 4. Upon entry into the second birefringent crystal 4, it becomes the new ordinary beam of the second birefringent crystal 4 and is refracted in accordance with Snell's law of refraction. The electric field of the ordinary beam S1O oscillates in the main section of the second birefringent crystal 4. Upon entry into the second birefringent crystal 4, it therefore becomes the new extraordinary beam and passes through the second birefringent crystal at an angle that can be determined from the components of the electric field of the new extraordinary beam. After they pass through the Savart element 14, the partial beams of the beam S1 thus exit the Savart element 14 at different points and subsequently are once again parallel with respect to one another due to Snell's law of refraction and perpendicular to the entry surface 3a. However, as described above, they have a phase difference. The phase difference of the two partial beams is dependent, as described above, among other things on the entry angle into the Savart element 14 and is zero for the perpendicular beam S1. Arranged in the beam path downstream of the Savart element 14 is the analyzer 5, which polarizes the radiation in the same direction as the polarizer 2. The two partial beams, after they pass through the analyzer 5, have the same polarization. As a result, the partial beams can interfere. A converging lens 6 is used to focus the partial beams on a point in the focal plane of the former. The two partial beams interfere. This produces an intensity spot on the detector 7 that is arranged in the focal plane of the lens 6. Since the converging lens 6 focuses all beams that are incident on it in parallel fashion on a point in the focal plane, all beams that are incident on the Savart element 14 in perpendicular fashion, like the first beam S1, form a common intensity spot on the detector. The second beam S2 is incident on the Savart element 14 at a different angle than the first beam Si. FIG. 1b depicts the schematic travel of the second beam S2 beginning at different positions on the diffuser 1. The second beam S2 is also split into an ordinary beam S2O and an extraordinary beam S2O. The ordinary beam S1O is refracted in the material according to Snell's law of refraction. The travel of the extraordinary beam S2A is determined as described above. All beams that are incident on the Savart element 14 at the same angle as the second beam S2 are focused on a common intensity spot in the focal plane of the lens 6 after passage through the polarization interferometer 15. Said intensity spot is detected by the detector 7. Each intensity spot on the detector 7 thus corresponds to a different path difference. The Savart element 14 generates different path differences. As the distance from the center of the detector 7 increases, the intensity spots are formed by interfering partial beams with an ever-increasing path difference. As a result, a spatially resolved interferogram is produced on the detector. This is required for a Fourier transform spectroscopy.

In a typical embodiment, the diffuser 1 is a quartz glass plate of 1 mm thickness having diffusing particles, which is adhesively bonded to a polarization film 2 having a thickness of 0.5 mm, which on a Savart element 14, comprising two plates of 3 mm thickness in each case made of rutile, which are arranged such that the optical axes OA1, OA2 are at an angle of in each case 45° with respect to the entry surface and in main sections that are arranged at 90° with respect to one another. Alternatively, in a further embodiment, rather than the plates made of rutile, plates of calcite can be arranged. Arranged on the exit surface of the Savart element 14 is a further polarization film having a thickness of 0.5 mm, which acts as an analyzer 5. The output light is then typically imaged onto a two-dimensional photodetector array 7a having a typical diagonal of 4 mm and 5 million image points via an achromatic focusing lens 6 having a focal length of typically 4 mm.

The signals of the individual pixels contain in one direction (e.g. row) the interferogram, from which the spectrum of the light that is incident on the diffuser 1 can be obtained by Fourier transform. This information is repeated in the other direction, with the result that a signal improvement can be achieved by way of averaging. The spectrum thus obtained can then be compared either directly to reference spectra, or can be chemometrically evaluated first and then compared to reference values in order to deduce the composition of the object under investigation.

In a further exemplary embodiment, the angle between the first optical axis OA1 and the entry surface 3a is selected to be between 30° and 60°.

It is possible in a further exemplary embodiment to use as a detector unit 12 not a fixedly installed detector unit 12, but the camera of a mobile radio device or of a security camera which is arranged externally. The diffuser 1 and the polarization interferometer 15 here form a unit that can be arranged on the camera during use.

In a further exemplary embodiment, a directional diffuser 1 can be used, which is adapted to a suitable opening angle of the Savart element.

Figure 2:
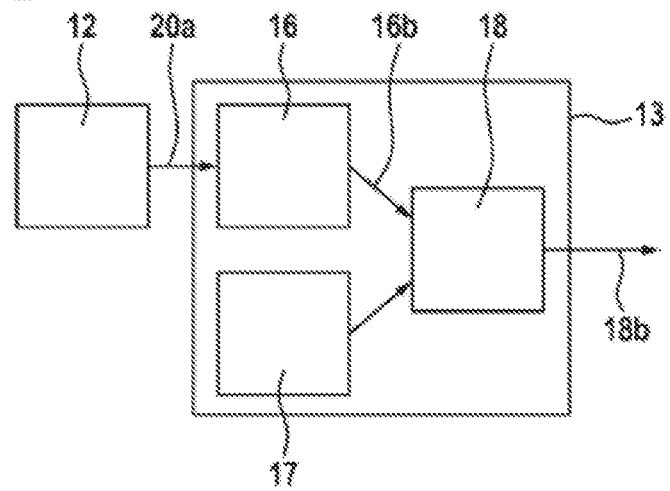
FIG. 2 shows a data unit of a miniature spectrometer according to the disclosure and the operating principle thereof.

FIG. 2 shows the operating principle of a data unit 13 that, in one exemplary embodiment, is integrated in the miniature spectrometer 8. In the detector unit 12, a spatially resolved interferogram 20a is produced. The latter is transmitted to the data unit 13. The data unit 13 in this exemplary embodiment comprises a data processing unit 16, a reference database 17, and a comparison unit 18. The spatially resolved interferogram 20a is transmitted to the data processing unit 16. Here, a Fourier transform of the interferogram is performed. The Fourier-transformed interferogram is a spectrum 16b of the radiation that is reflected, transmitted or emitted by an object to be investigated. Spectra of known objects, chemical compositions, materials etc. are stored in the reference database 17. The spectrum 16b of the radiation that is reflected, transmitted or emitted by an object to be investigated is compared to known spectra in the comparison unit 18, which can be performed before or after application of chemometric algorithms. Consequently, the spectrum 16b of the radiation that is reflected, transmitted or emitted by an object to be investigated is assigned to a known object, a known chemical composition, a known material etc. This provides information relating to the object to be investigated. The spectral information 18b or higher-value information ascertained therefrom, such as material properties of the object to be investigated, forms the output of the data unit 13. Here, raw data 20a, the Fourier-transformed spectrum 16b or the information relating to the object obtained after the chemometric analysis can be optionally indicated to the user.

Figure 3:
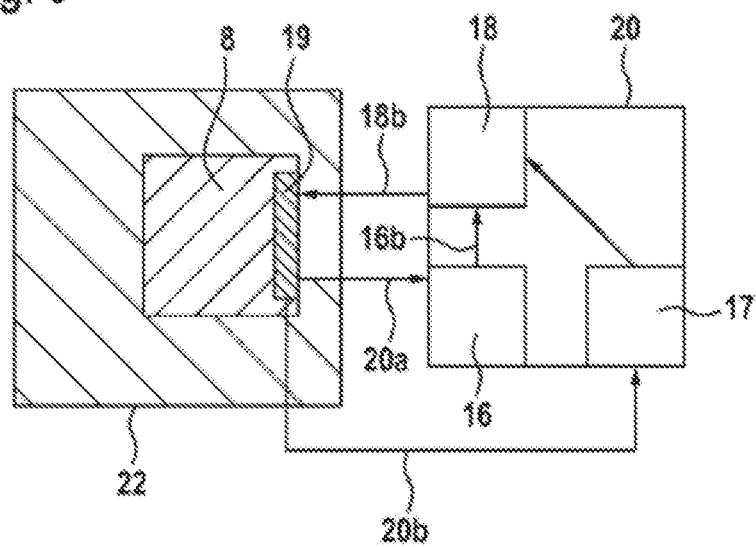
FIG. 3 shows a miniature spectrometer according to the disclosure having an external evaluation unit.

FIG. 3 shows an exemplary embodiment, in which the data unit is configured as a communication interface 19. The miniature spectrometer 8 is here integrated in an electronic device 22. The communication interface 19 permits data transmission 18b, 20a, 20b between the miniature spectrometer 8 and an external evaluation element 20. The data transmission 18b, 20a, 20b can be implemented for example via an Internet connection, LAN, WLAN, USB, Bluetooth or infrared radiation. To this end, the evaluation element 20 is configured to receive the data from the communication interface 19. The interferogram 20a recorded by the detector 7 in this exemplary embodiment is evaluated not in the miniature spectrometer 8, but in the external evaluation element 20. The external evaluation element 20 comprises a data processing unit 16, a reference database 17 and a comparison unit 18. The spatially resolved interferogram 20a is transmitted via data transmission 18b, 20a, 20b to the data processing unit 18, e.g. in a cloud. The latter produces therefrom, using a Fourier transform, the spectrum 16b of the radiation that is reflected, transmitted or emitted by an object to be investigated. As described above, the spectrum 16b of the radiation that is reflected, transmitted or emitted by an object to be investigated is compared to the known spectra of the reference database 17 in the comparison unit 18, which can be performed before or after application of chemometric algorithms. The spectral information 18b of the object to be investigated is an evaluation result that is transmitted back to the communication interface 19 by data transmission. In this exemplary embodiment, feedback 20b of the user of the electronic device 22 is provided via data transmission 18b, 20a, 20b. The user evaluates the evaluation result if possible with respect to the quality thereof. The reference database 17 of the external evaluation element 20 can be updated and improved thereby. In particular, the external evaluation element 20 can be used by a plurality of users. Due to the assessments of the users, the quality of the evaluation results is improved. In this way, the user can record spectra of substances known to them and assess whether they have been correctly identified by the device.

In an exemplary embodiment not illustrated here, the external evaluation element 20 comprises a reference database 17 and a comparison unit 18. In this exemplary embodiment, the data unit is configured as a communication interface 19 and comprises the data processing unit 16. The communication interface 19 permits data transmission between the miniature spectrometer 8 and the external evaluation element 20. Data transmission can be implemented by way of example via Internet connection, LAN, WLAN, USB, Bluetooth or infrared radiation. The evaluation element 20 is for this purpose configured to receive the data from the communication interface 19. The spectrum 16b of the radiation that is reflected, transmitted or emitted by an object to be investigated is determined in the data processing unit 16 and transmitted to the external evaluation element 20 via data transmission. Here, the evaluation is performed as described above.

Figure 4:
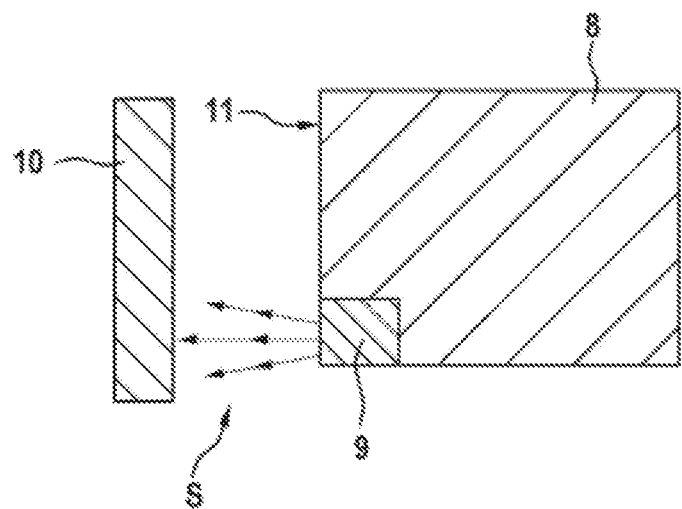
FIG. 4 shows a miniature spectrometer according to the disclosure having an integrated light source.

FIG. 4 shows an exemplary embodiment of a miniature spectrometer 8 having an integrated light source 9. The light source is used to irradiate S the object 10 to be investigated in order to increase the intensity of the reflected radiation or to excite the object to be investigated to emit radiation.

The invention claimed is:

1. A miniature spectrometer, comprising:
an optical system configured as a diffuser;
a polarization interferometer that includes a polarizer, a Savart element, and an analyzer;
a detection unit that includes a detector; and
a data unit,
wherein the diffuser ensures utilization of an acceptance angle of the Savart element and is arranged on the polarizer of the polarization interferometer.

2. The miniature spectrometer as claimed in claim 1, wherein the detection unit comprises a focusing optical unit that is arranged in the beam path between the polarization interferometer and the detector.

3. The miniature spectrometer as claimed in claim 1, wherein the miniature spectrometer comprises a light source.

4. The miniature spectrometer as claimed in claim 1, wherein the data unit comprises a reference database.

5. The miniature spectrometer as claimed in claim 1, wherein the data unit is configured as a communication interface for data transmission between the miniature spectrometer and an external evaluation element that includes a reference database and a data processing unit.

6. The miniature spectrometer as claimed in claim 1, wherein the detector is in the form of a one-dimensional sensor matrix.

7. The miniature spectrometer as claimed in claim 1, wherein the detector is in the form of a two-dimensional sensor matrix.

8. The miniature spectrometer as claimed in claim 1, wherein the optical system is a directional diffuser.

9. A method for using a miniature spectrometer to ascertain a spectrum of radiation from an object, the miniature spectrometer including an optical system configured as a diffuser, a polarization interferometer that includes a polarizer, a Savart element, and an analyzer, a detection unit that includes a detector, and a data unit, the method comprising:
deflecting the radiation, which is incident on a first side of the diffuser, in different directions upon passage through the diffuser, the diffuser arranged on the polarizer and configured to ensure utilization of an acceptance angle of the Savart element;
linearly polarizing the radiation exiting the diffuser via the polarizer;
passing the linearly polarized radiation through the Savart element;

polarizing the radiation exiting the Savart element via the analyzer;
detecting the radiation exiting the analyzer via the detector, the detector producing an interferogram; and
transmitting the interferogram to the data unit, which ascertains the spectrum from the object.

* * * * *